United States Patent
Fahner

(10) Patent No.: US 8,682,762 B2
(45) Date of Patent: Mar. 25, 2014

(54) CAUSAL MODELING FOR ESTIMATING OUTCOMES ASSOCIATED WITH DECISION ALTERNATIVES

(75) Inventor: Gerald Fahner, Austin, TX (US)

(73) Assignee: Fair Isaac Corporation, San Jose, CA (US)

( * ) Notice: Subject to any disclaimer, the term of this patent is extended or adjusted under 35 U.S.C. 154(b) by 638 days.

(21) Appl. No.: 12/958,368

(22) Filed: Dec. 1, 2010

(65) Prior Publication Data

US 2011/0137847 A1 Jun. 9, 2011

Related U.S. Application Data

(60) Provisional application No. 61/265,678, filed on Dec. 1, 2009.

(51) Int. Cl.
*G06Q 40/00* (2012.01)

(52) U.S. Cl.
USPC .......................................................... 705/35

(58) Field of Classification Search
None
See application file for complete search history.

(56) References Cited

PUBLICATIONS

Rubin et al., "Estimating the Causal Effects of Marketing Interventions Using Propensity Score Methodology", 2006, Statistical Science, vol. 21, No. 2, pp. 206-222.*
Rubin, Estimating Causal Effects of Treatments in Randomized and Nonrandomized Studies, 1974, Journal of Educational Psychology, vol. 66, No. 5, pp. 688-701.*

* cited by examiner

*Primary Examiner* — Olabode Akintola
(74) *Attorney, Agent, or Firm* — Mintz Levin Cohn Ferris Glovsky and Popeo, P.C.

(57) ABSTRACT

A method and system for estimating potential future outcomes resulting from decision alternatives is presented to enable lenders to make lending related decisions. The estimation is based on a propensity score variable that encompasses an effect of multiple covariates associated with one or more individuals for whom the estimation is being performed. For consistency with empirical testing, the estimation approach assumes conditions of unconfoundedness and localized common support. According to the unconfoundedness assumption, for a given variable, the potential outcomes are conditionally independent of the decision alternatives. According to the localized common support assumption, an overlap is ensured between individual accounts that are categorized together as potentially having the same future outcome. The outcomes and an effect (e.g. comparison) of the outcomes may be displayed graphically.

20 Claims, 11 Drawing Sheets

CAUSAL MODELING FOR ESTIMATING OUTCOMES ASSOCIATED WITH DECISION ALTERNATIVES

CROSS REFERENCE TO RELATED APPLICATIONS

This application claims the benefit of priority under 35 U.S.C. §119 to U.S. Provisional Patent Application Ser. No. 61/265,678 filed on Dec. 1, 2009, entitled, "Casual Modeling System and Method", the entire disclosure of which is incorporated by reference herein.

TECHNICAL FIELD

The subject matter described herein relates to a method for estimating potential future outcomes resulting from decision alternatives. More specifically, the subject matter herein relates to a causal modeling approach to estimate, based on particular conditions, outcomes of various decision alternatives.

BACKGROUND

Making credit decisions under uncertainty may be approached in principle by a process known as estimation, i.e., estimating potential future outcomes resulting from decision alternatives. Potential outcomes may vary for different individuals based on many variables, including credit score, risk score, behavior score, age, property ownership, and other variables associated with the individuals. However, when estimation is performed, individuals may be categorized into different groups that may be associated with different covariates. Accordingly, a selection bias may be performed to deal with an issue of multiple covariates. However, the selection bias carries inaccuracies and other problems. Therefore, to deal with the issues of selection bias, there is a need for a method that uses a single variable instead of multiple covariates, where the single variable may encompass the effect of the multiple covariates.

Furthermore, conventional estimation techniques are often based on intuition and estimates made by these conventional techniques may not conform to empirical results that can be obtained by adequate historic testing. For example, it may be intuitive that individuals lying within a high income group may have a higher probability of taking a loan at a particular interest rate premium as compared to an individual within a lower income group. However, if sufficient historic testing is performed, the aforementioned intuition may not hold true, being that each individual may be associated with multiple covariates rather than just one covariate. Thus, a complex multidimensional problem due to multiple covariates needs to be solved. Accordingly, there is a need to perform estimation of potential outcomes in a convenient way such that estimation in consideration of all the covariates can be fairly represented by a corresponding estimation in consideration of a single variable that takes into account the effect of all the covariates.

SUMMARY

This document presents a system and method for estimating potential future outcomes resulting from decision alternatives. The estimated potential future outcomes can be used by lenders to make lending related decisions, for example. The estimation is based on a propensity score variable that encompasses an effect of multiple covariates associated with one or more individuals for whom the estimation is being performed. For consistency with empirical testing, the estimation approach assumes conditions of unconfoundedness and localized common support. According to the unconfoundedness assumption, for a given variable, the potential outcomes are conditionally independent of the decision alternatives. According to the localized common support assumption, an overlap is ensured between individual accounts that are categorized together as potentially having the same future outcome. The outcomes and an effect (e.g. comparison) of the outcomes may also be displayed graphically.

In one aspect, a method comprises the following steps: determining, using one or more processors, covariates associated with a unit representing at least one of an individual and an account of the individual; determining, using the one or more processors, decision alternatives based on the covariates; determining, using the one or more processors, potential outcomes for the decision alternatives; and determining, using the one or more processors, a treatment effect by performing a statistical analysis using the potential outcomes.

In a further aspect, the decision alternatives comprise a treatment and a control. In a still further aspect, the treatment is a decision alternative that is undertaken for the unit such that the treatment occurs in an observed environment; and the control is a decision alternative that is not undertaken for the unit such that the treatment occurs in a hypothetical environment. In yet another aspect, the determining of the potential outcomes is performed using a causal model, which is a rubin causal model. In another aspect, the causal model accounts for multiple dimensions corresponding to the determined covariates by determining a propensity score that encompasses an effect of the determined covariates such that the causal model is based on a single dimension corresponding to the propensity score. In a further aspect, the determining of potential outcomes is based, for consistency of the determined potential outcomes with empirical historical results, on conditions of unconfoundedness and localized common support. In one aspect, the unconfoundedness is associated with the determined potential outcomes that are conditionally independent of the decision alternatives; and the localized common support is associated with a conditional probability that is between zero and one, the conditional probability being a propensity score that encompasses an effect of the determined covariates when the determining of the potential outcomes is performed. In another aspect, the determined potential outcomes and the treatment effect are displayed graphically.

In other aspects, computer program products may be presented that comprise a machine-readable medium storing instructions that, when executed by at least one programmable processor, cause the at least one programmable processor to perform noted operations. In further aspects, systems may be presented that comprises at least one programmable processor, and a machine-readable medium storing instructions that, when executed by the at least one processor, cause the at least one programmable processor to perform the noted operations.

Articles are also described that comprise a computer-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, the presented methodology enables an empirical support for determining potential outcomes based on a localized approach as opposed to a conventional global approach that may be intuitive. Thus, the presented methodology obviates the errors that may be caused by using at least one of intuition and conventional approach.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
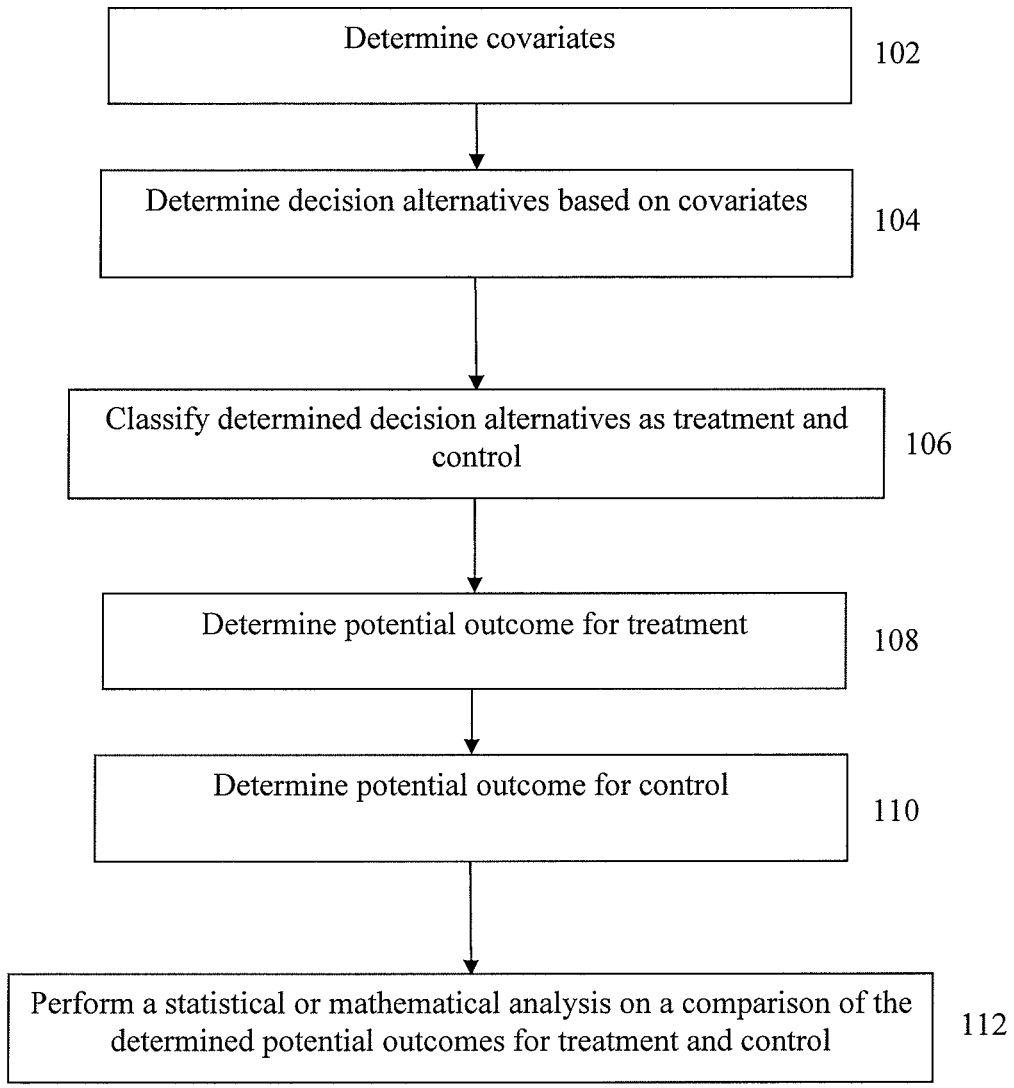
FIG. 1 is a flowchart illustrating aspects of a method in consistency with implementations of the current subject matter.

To address these and potentially other issues with currently available solutions, one or more implementations of the current subject matter provide methods, systems, articles or manufacture, and the like that may, among other possible advantages, provide a method for estimating potential future outcomes resulting from decision alternatives. The potential future outcomes are estimated using an empirical causal modeling approach.

The following exemplary implementations have been presented to enable a lender to estimate potential outcomes for making lending decisions. However, the approach may be applied to other areas of making decisions when one or more decision alternatives are available. For example, the exemplary implementations may be used by a student to decide which college to attend when the student has multiple college options, or may be used by a technologist to decide what software application to purchase when multiple software applications are available in the market, or even may be used by an investor to decide a property in which to invest when the investor has multiple options, and the like.

In accordance with some implementations, first, a framework for a causal model is used to estimate potential outcomes associated with decision alternatives. In some specific implementations, a Rubin Causal Model is used. The Rubin Causal Model further determines the effect of the outcomes. The effect may include a simple subtraction of outcomes associated with dichotomous decision alternatives, as is described later with respect to FIG. 2. A conceptual approach of the estimation is described below. The conceptual approach is based on assumptions of unconfoundedness and localized common support, which are further described below. Results of empirical analysis based on historic data are also presented.

Rubin Causal Model

The Rubin Causal Model performs a statistical analysis of cause and effect based on a framework of potential outcomes. The Rubin Causal Model is based on an idea that each "unit" may be associated with different potential "outcomes" depending on an "assignment" to a "condition." The "unit" may be a particular account of a particular consumer, and may be represented as [consumer, account]. The consumer may be a client (borrower) of a financial institution (lender). The "outcomes" refer to corresponding results obtained in response to respective credit decision alternatives. For example, an outcome may indicate that lending may not be provided under a first assignment but lending may be provided under a second assignment condition. The "assignment" refers to a credit decision alternative that may be taken based on which a respective outcome is generated. For example, an assignment may be a credit line increase for an account to $15,000. The "condition" refers to any necessary requirements that may be required or assumed. The condition described below with respect to one implementation includes unconfoundedness and localized common support, as described in more detail below.

The Rubin causal model can be further explained using another example, as follows. A person may have one income at age 50 if the person attends a private college, and a different income at age 50 if the person attends a public college. To measure the causal effect of decision alternatives of going to a public college versus a private college, a Rubin Causal Model generates potential outcomes for the person in both alternative future scenarios. Both alternative scenarios may or may not occur at the same time. That is, the person may not go to a private college and a public college at the same time such that he may make two different incomes at the same time. Thus, to determine the potential outcomes that occur based on alternative assignments, mathematical methods may be implemented. In the randomized experiment, 50 year old people are assigned randomly to (in this example) a public college or private college. The groups of people have almost equal number of people since the experiment is random. Thus, the difference in outcomes (incomes at age 50 that correspond to respective college assignments) may be attributed to the college assignment, since that was the only difference between the groups.

FIG. 1 is a flowchart illustrating a method 100 for estimating potential outcomes for a customer based on corresponding decision alternatives. In some implementations, the method 100 employs a Rubin Causal Model. The method 100 is preferably implemented by one or more computer processors. At 104, decision alternatives are determined based on covariates. At 104, decision alternatives based on covariates are determined. At 106, decision alternatives as treatment and control are classified. At 108, one or more potential outcomes for treatment are determined, and at 110 one or more potential outcomes for control are determined. At 112, a statistical or mathematical analysis on a comparison of the determined potential outcomes for treatment and control is performed.

Figure 2:
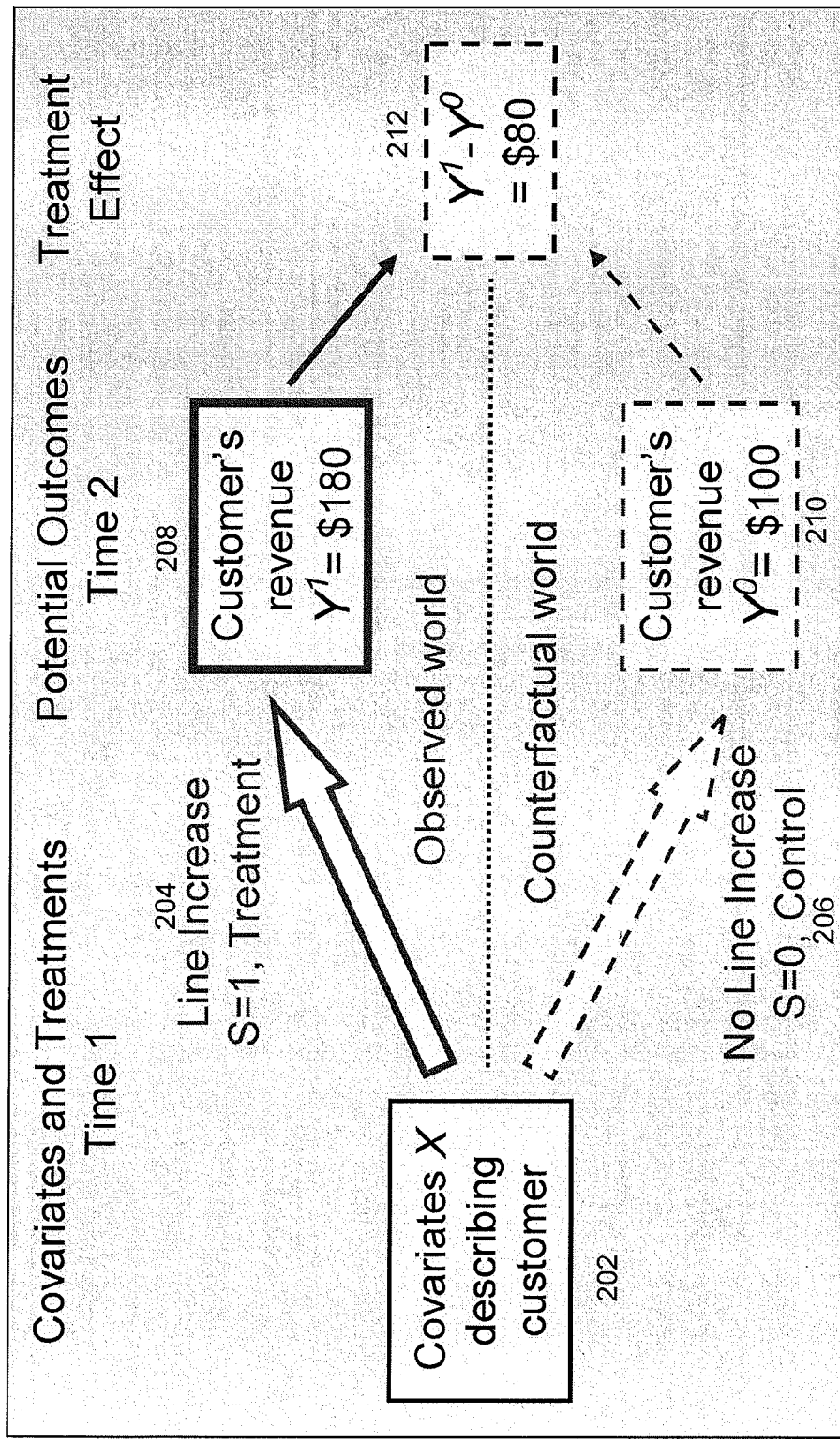
FIG. 2 is another flowchart illustrating aspects of a method in consistency with implementations the current subject matter.

FIG. 2 illustrates a system 200 including the covariates 202. The covariates 202 associated with a consumer include risk score, income, age, channel, residence ownership or rental status, and the like. Two consumers with different covariates 202 (e.g. risk scores) may be associated with different decision alternatives, and hence different potential outcomes. FIG. 2 illustrates dichotomous decision alternatives, which may include (1) an increase of credit line 204, and (2) no line increase 206.

"Treatment" 204 refers to an alternative that is actually adopted, whereas "control" 206 refers to the other alternative that is not adopted. For example, if the decision alternatives comprise (a) an increase of a credit line and (b) no increase of the credit line, and if the credit line is actually increased, then the treatment 204 refers to an increase of the credit line, and control 206 refers to a no increase of the credit line. As per the example of deciding a college; as noted above, if a person goes to a private college rather than a public college, then treatment 204 refers to attending private college, and control 206 refers to the option of attending public college. Thus, the treatment 204 occurs in factual or observed world 214, whereas the control 206 occurs hypothetically in counterfactual world 216. FIG. 2 illustrates an increase of credit line being a treatment 204 and no line increase 206 being a control 206. A value of an indicator classifies whether a decision alternative has been classified as treatment 204 or control 206. For example, S=1 indicates that the decision alternative is a treatment 204, and S=0 indicates that the decision alternative is a control 206. Although the decision alternatives are dichotomous and classified as treatment 204 and control 206, one of ordinary skill in the art will understand that there may be other classifications of the decision alternatives.

FIG. 2 illustrates a potential outcome 208 for treatment 204, where the customer's revenue is determined as Y1=$180. Further, FIG. 2 illustrates a potential outcome 210 for control 206, where the customer's revenue is determined as Y0=$100. Furthermore, FIG. 2 illustrates calculating a treatment effect 212 using potential outcomes 208, 210, as $\lfloor Y^1-Y^0 \rfloor$=$80.

In one implementation, the decision alternatives are dichotomous decision alternatives. However, one of ordinary skill in the art will understand that more than two (dichotomous) decision alternatives may be used. The dichotomous decision alternatives are referred to as "treatment" 204 and "control" 206.

As noted above, FIG. 1 and FIG. 2 illustrate an implementation for a single customer or an account. The following describes an extension of the implementation to multiple units that correspond to multiple customers, wherein each unit comprises an account of a particular customer.

Let there be a predetermined number (N) of units. Thus, units (individuals, accounts) i=1, . . . , N. For each unit, a pair of potential outcomes 208, 210, control 206 $Y_i^0$ and treatment 204 $Y_i^1$ are posited. Each unit receives either control 206 or treatment 204, as indicated by treatment indicator $S_i$. If $S_i$=0, the decision alternative is a control 206, and if $S_i$=1, the decision alternative is a treatment 204. Thus, for each of the pairs, there is a corresponding control 206 and a corresponding treatment 204. $Y_i$ is the observed potential outcome, such that $Y_i=Y_i^0$ (element 210) if $S_i$=0, and $Y_i=Y_i^1$ (element 208) if $S_i$=1. As noted earlier, only one potential outcome 208 of the pair of potential outcomes 208, 210 is observed in the factual or observed world 214, whereas the other potential outcome 210 of the pair, is unobserved in the factual or observed world 214 but occurs in the hypothetical or counterfactual world 216. Units are characterized by their observed covariates $X_i$ 202, which are variables not influenced by treatment 204 or control 206. The covariates 202 are typically measured prior to the treatment 204. The unit-level treatment effect 212 is defined as the difference between the potential outcomes 208, 210, i.e. $Y^1-Y^0$. This is an unobservable random variable, because $Y^0$ 210 and $Y^1$ 208 may never exist together for the same unit, as only $Y^1$ 208 occurs in observed world 214, whereas $Y^0$ 210 occurs hypothetically in the counterfactual world 216.

Conditions of Unconfoundedness and Common Support that are Required for estimation:

For two or more decision alternatives, multiple pairs of treatment 204 and control 206 may be formed. Thus, there are multiple values for $Y_i^0$ 210 corresponding to i values for respective units. Similarly, there are multiple values for $Y_i^1$ 208 corresponding to i values for respective units. FIG. 2 illustrates a treatment effect $\lfloor Y^1-Y^0 \rfloor$ 210 for a single pair. For the multiple pairs, an estimated average treatment effect needs to be obtained. Thus, there is a need for estimating the average (expected) treatment effect $\theta \equiv E\lfloor Y^1-Y^0 \rfloor = E\lfloor Y^1 \rfloor - E\lfloor Y^0 \rfloor$. Note that the expected value of a variable is also denoted by E[variable]. The estimate E[Y|S=1]−E[Y|S=0] may be incorrect if the two treatment groups correspond to different covariates 202 that are determined prior to implementing treatment 204. Thus, if the two treatment groups correspond to different covariates 202, a severe selection bias may be caused. Accordingly, assumptions and/or requirements need to be incorporated that allow a highly accurate estimation of an average treatment effect when multiple pairs corresponding to multiple units exist.

The assumptions and/or requirements that are incorporated to estimate the average treatment effect include unconfoundedness and common support, which are described as follows.

Unconfoundedness: Unconfoundedness is also known as conditional independence or selection on observables. Unconfoundedness requires $(Y^0, Y^1) \perp S | X$, i.e. for given covariates X 202, potential outcomes ($Y_i^0$ and $Y_i^1$) 208, 210 are independent of decision alternatives 204, 206. Thus, the potential outcomes ($Y_i^0$ and $Y_i^1$) 208, 210 are conditionally independent of decision alternatives 204, 206.

Common support: Common support is also known as overlap. Common support requirement/assumption necessitates that $0 < p(X) \equiv Pr\{S=1|X\} < 1$, i.e. at each value of covariate X, there is a nonzero probability that a decision alternative is specifically a treatment 204. The conditional probability is also known as propensity score, which is denoted by p(X).

The unconfoundedness requirement/assumption necessitates the following equation:

$$E[Y^k|X=x] = E[Y^k|S=k,X=x] = E[Y|S=k,X=x]; k \in \{0,1\} \quad \text{Equation (A)}$$

The average treatment effect for the subpopulation that is associated with covariates X 202 being equal to "x," i.e. X=x, is defined as:

$$\theta(x) \equiv E[Y^1 - Y^0 | X=x] \quad \text{Equation (B)}$$

Substituting Equation (A) in Equation (B), the average treatment effect considering unconfoundedness is defined as:

$$\theta(x) = E[Y|S=1, X=x] - E[Y|S=0, X=x] \quad \text{Equation (C)}$$

The expression of Equation (C) may be estimated for any value of x with a nonzero probability of a decision alternative being a treatment 204, as is required by the common support condition.

Given a small region in covariate space around X=x (i.e. accounts that are associated with covariates that lie close in covariate space to covariates x) with common support, the local average difference between the outcomes corresponding to treatment 204 and control 206 may be estimated. Consequently, $\theta = E_x[\theta(x)]$ may be estimated. Conditioning on X=x removes the bias due to observable covariates 202. In the foregoing, common support is assumed to be localized rather than conventionally assumed global common support.

Matching on the Propensity Score:

The estimation for average treatment effect, as discussed above, is performed for units [consumers, accounts] that have covariates 202 that lie close to covariate x in covariate space. However, practically, it may be difficult to find units that have similar/close covariates 202, as it may not be mathematically convenient to deal with multiple dimensions corresponding to multiple covariates 202 when finding similar units. Moreover, it may not be convenient to deal with the multiple dimensions when performing calculations for estimation, since multiple dimensions may use too much increased memory space or utilize too much load on the processor.

Thus, a single variable can be used that represents one dimension and which encompasses a contribution of multiple covariates 202 using a propensity score p(X).

If unconfoundedness holds, then $(Y^0, Y^1) \perp S | p(X)$ also holds, i.e. the potential outcomes and decision alternatives are conditionally independent given the propensity score. Thus, biases due to observable covariates 202 may be removed by conditioning on the propensity score alone.

Accordingly, the following equation may be used, instead of using Equation (C) noted earlier, to determine the estimated average treatment effect:

$$E[Y^1 - Y^0 | p(X=x)] = E[Y|S=1, p(X=x)] - E[Y|S=0, p(X=x)] \quad \text{Equation (D)}$$

Usage of Equation (D) instead of Equation (C) reduces the dimension of the estimation problem from the high-dimensional covariate space to a single dimension, the single dimension being the propensity score p(X). Given a small interval [p, p+Δp] of propensity score values, the local average difference of the outcomes between the treated and control units may be determined with propensity scores values in that interval.

As illustrated in FIG. 2, matching is a technique of sampling units to generate treatment groups and control groups that are comparable (i.e. associated covariates 202 of units are close to each other in covariate space) in terms of their covariate distributions. Matching based on the propensity score alone ensures same probability distributions for the observed covariates 202 of unit, wherein the observed covariates 202 are close to each other in covariate space. Matching based on propensity score is a useful single parameter tool to adjust for treatment vs. control group differences in all observed covariates 202, thereby removing any selection bias (as noted earlier) due to multiple covariates 202, before comparing outcomes from treated and controls.

To evaluate Equation D, first a propensity score p(X) is determined. Matching is then based on the determined propensity score, including dividing propensity score space into multiple intervals such that units within a particular interval have propensity scores that are close (e.g. within a predetermined distance) to each other. Further, these units have approximately the same estimated odds of both a decision alternative being a treatment 204 and the decision alternative being a control 206. The common support requirement/assumption ensures that in each interval, some treatment and some control units (assuming large enough sample size) are found. The treatment 204 units and the control 206 units are matched for a same interval. The matched treatment units have averages of associated covariate values, the averages being similar to averages of covariate values for the matched control units. If the averages are not similar, for example, if average of covariate values associated with the matched treated group is significantly higher than average of covariate values associated with the matched control group, then a particular covariate that may have caused the associated average to significantly increase may provide additional information about treatment odds over and above the propensity score estimate. Therefore the estimated propensity score may be improved by modeling the relationship with this particular covariate, until the covariate averages between matched treated and controls eventually become balanced (not significantly different from each other). Accordingly, when developing the estimated propensity score, it is important to assess the balancing associated with the propensity score and improve the propensity score if deemed necessary.

Multiple Treatments:

The definition of treatment effects may be extended to multiple treatments. Units receive treatments $T_i \in \{1, \ldots, K\}$ from a discrete set, and outcomes $Y_i^{T_i}$ associated with the treatments received are observed. Counterfactual outcomes $Y_i^k; k \in \{1, \ldots, K\} \setminus T_i$ are not observed as they are hypothetical. In consistency with above-noted definition for binary causal average treatment effect, average treatment effect and local treatment effect of treatment j relative to treatment k are defined as:

$$\theta_{jk} \equiv E[Y^j - Y^k]$$

$$\theta_{jk}(x) \equiv E[Y^j - Y^k | X=x]$$

The propensity score is defined for dichotomous treatment versus control 206 alternatives, although more than two treatments may be handled by analyzing a set of dichotomous problems. For each dichotomous problem, units that do not belong to the dichotomy are ignored. For example, consider a problem with three treatments. For a given K number of treatments, there are K(K−1)/2 unordered dichotomies. Therefore, for three treatments, there are three associated (control, treatment) dichotomies, which are {(1,2), (1,3), (2,3)}. To analyze (2,3), all units that receive treatments other than 2 or 3 are ignored. In this example of three treatments, all units receiving treatment 1 are ignored. By defining a binary control vs. treatment indicator S that may have a single binary value (either 0 or 1, e.g. S=0 if treatment is 2 and S=1 if treatment is 3), it is possible to revert back to the rubin causal model that uses control versus treatment framework, as described earlier. Only unordered dichotomies need to be considered, since switching the definition of treatment 204 and control 206 only changes the sign of the treatment effect.

Plausibility of Unconfoundedness and Common Support Assumptions:

Unconfoundedness and common support assumptions/conditions hold if treatments are assigned randomly and there is a nonzero probability of a decision alternative being specifically a treatment, wherein the nonzero probability is calculated based only on observed covariates 202. As noted above, unconfoundedness and common support are assumed for estimating the average treatment effect. Since business operations occur only in observed world 214 rather than additionally in counterfactual world 216, it may be difficult or impossible to estimate the average treatment effect from business-as-usual data. However, it may still be possible to estimate useful treatment effects for improving business operations, based on thoughtful data collection, careful relaxation of assumptions to consider the fact that business-as-usual data occurs only in observed world 214 rather than both observed world 214 and counterfactual world 216, appropriate modeling and estimation strategies, and by accompanying conclusions with appropriate warnings concerning assumptions and limitations. If assumptions appear strenuous (i.e. if unconfoundedness and common support assumptions appear not to be relaxed), business decisions based on the modeling results may be carefully validated by domain experts and tested on a limited scale, before making major changes to a business operation based on the estimated average treatment effect.

The plausibility of each assumption is considered below:

Plausibility of Unconfoundedness:

For applications where treatments are assigned in an automated way based on observed covariates 202, the unconfoundedness assumption is plausible provided high integrity of data collection. For the automation, all variables used to assign treatments are stored and made available for analysis. Financial institutions generally base their treatment decisions on rules. The automated systems that provide the automation depend entirely on observed covariates 202, possibly up to a random term from randomized testing. The observed covariates 202 may include multiple data sources such as credit bureau data and scores, application information and origination scores, account transaction data and behavioral and transaction scores, and collection data and scores associated with the collection data. All the variables that are used to select/assign treatments are stored as covariates 202 in one or more databases. The stored variables may be retrieved from the one or more databases and used for assigning treatments using robust decision management architectures. In case of automated assignment of treatments, as noted above, the unconfoundedness condition is plausible.

On the other hand, when the treatments are assigned manually (i.e. when treatment decisions are made by a human operator), the unconfoundedness assumption is not plausible. If confounding/confusing variables that are jointly associated with treatment and potential outcomes remain unobserved (i.e. not observed in observed world 214), then no estimation technique may accurately calculate an average treatment effect, and thus calculated average treatment effect estimates may be biased. In such cases of biased treatment effect estimation, analysts may collect as many potential confounding/confusing variables as possible, which may include as much as possible of information considered relevant for assigning treatments. Generally, any variable of the collected variables that is not influenced by the treatment is selected and is included in a covariate set. Some of the variables (covariates 202) included in the covariate set are correlated to a sufficient degree with potentially unobserved confounding/confusing variables, such that controlling for observed covariates 202 constitutes a sufficient control also for the unobserved confounding variables. Thus, unconfoundedness may be a problematic assumption when treatments are assigned manually, since manual decisions may take into account "hidden variables" containing some additional information about potential outcomes over and above the information contained in the observed and stored covariates 202. For example, hidden variables may comprise personal impressions of an entity making manual decisions.

Next, plausibility of common support is discussed, under the assumption that unconfoundedness holds.

Plausibility of Common Support:

The common support condition is not plausible for operations that assign treatments consistently as functions of measured covariates 202 and that do not engage in randomized testing. The reason for the aforementioned non-plausibility is that any one of customer segmentations, rule-based decision systems, treatment selection based on scores, etc., may render a probability of receiving a certain treatment to be exactly 0 or 1 across subsets of the covariate space. For example, consider a simple rule that assigns every customer whose income is below a cutoff value to control 206 decision alternative, and that assigns every other customer whose income is above the cutoff value to treatment 204 decision alternative. In such a case of the simple rule, a probability of a particular income to be treated as a treatment 204 (or a control 206) is either 0 or 1. Thus, the propensity score (a function of income) is either 0 or 1, and accordingly there is no common support, which requires the probability to be between 0 and 1 rather than being either 0 or 1.

Estimation of causal treatment effects may still be attempted based on parametric modeling, and may be limited to a local area around the cutoff, where a researcher is confident about making a functional assumption on the extrapolation. Linear or low order extrapolations are generally regarded as defensible locally, as long as treatment effects are estimated only for "borderline" cases between two decision alternatives. Alternatively, modeling of propensity score may be performed by a somewhat smooth function of income that switches more gradually from 0 to 1 over a local area around the cutoff, thus mapping out a local region of "approximate" common support.

While simple cutoff decision rules create some common support problems, businesses often employ far more complex decision rules, where the treatment becomes a high-order interaction function in several covariates 202. Such rules may create many convoluted ripples in the treatment assignment function and thus many borderline cases. If the propensity score is modeled by a lower order function of X, while the true propensity score is a high-order function of X, then approximate common support regions may again emerge. The price to pay for low-order propensity score approximation is that certain higher order moments of X may not be well balanced between the treatment and the control group, even after controlling for the estimated propensity score. This unbalance may theoretically lead to biases, if the potential outcomes depend on such unbalanced higher-order functions of covariates 202. However, problems associated with biases are of a lesser concern when it is plausible to assume that the potential outcomes depend on X through a reasonably smooth, lower-order function. To obtain a bias free treatment decision alternative, the lower-order moments are balanced first, whereas balancing complex interactions is less important. In some implementations, human or computerized judgment may be used to balance all covariates 202 and their interactions simultaneously. In further implementations, outcomes from credit decisions may be modeled accurately by additive functions of the covariates 202, especially when a large number of covariates 202 are available for modeling and when some covariates 202 already represent transformations of raw variables that model interactions between raw variables.

The situation may be much improved for businesses that perform randomized testing. In practice, experimental test regions may be just as irregular as aforementioned assignment rules, rather than completely continuous to fill entire space. Cost considerations are one reason to constrain experiments to certain regions. Another reason to constrain experiments to certain regions is that experiments may not be designed to estimate treatment effects, but rather maybe designed to compare alternative decision rules, as in the so-called champion/challenger testing of credit decision strategies. As a result, the common support condition may not be globally met, but only across certain subsets of the covariate space and the treatment space that "see" experimentation.

The above-noted characteristics of business applications, such as non-continuity of experimental test regions, may make it difficult to estimate the average treatment effect. Practically, for a business that has already a successful and profitable rule-based decision system in place, the focus is on how to improve the operation. Accordingly, estimation of treatment effects for subsets of covariate space where common support may be found may alone create opportunities to improve the treatments for those subsets.

Next; the estimation process is described. In the following, a local common support rather than a global common support will be assumed in consistency with the foregoing.

Estimation Process (Estimation of Outcomes):

Conceptual details of the process of estimating potential outcomes 208, 210 are described. The potential outcomes 208, 210 need to be estimated for each unit and each treatment 204 or control 206. Accordingly, estimated potential outcomes 208, 210 may be stored for each unit and each treatment 204. Table 1 illustrates a table where the estimated potential outcomes are stored.

TABLE 1

| Units | Treatments | | |
|---|---|---|---|
| | k = 1 | k = 2 | k = 3 |
| 1 | | | |
| 2 | | | |
| 3 | | | |
| 4 | | | |

A dot (not shown) in Table 1 may indicate a counterfactual outcome 210 in counterfactual world 216.

For each treatment 204, a model $\hat{Y}^k(X)$; k=1, . . . , K is developed for the regression of potential outcome $Y^k$ on covariates 202X among the units that receive treatment k, that is $E[Y^k|T=k, X]$. The reason for performing separate regressions for each treatment group rather than a same regression for multiple regression groups or the whole population is that the treatment groups may come from different populations that behave differently. The estimated potential outcomes are smoothed and the smoothed estimated potential outcomes are stored in a table illustrated by Table 2.

TABLE 2

| Units | Treatments | | |
|---|---|---|---|
| | k = 1 | k = 2 | k = 3 |
| 1 | | | |
| 2 | | | |
| 3 | | | |
| 4 | | | |

To avoid extrapolation risk associated with extrapolating missing estimates from calculated estimates, counterfactual potential outcomes 210 are not determined using the above-noted models. Instead, the problem of extrapolating counterfactual outcomes 210 is approached by first identifying common support regions for dichotomous treatment comparisons. Where common support is found, local models are developed to estimate treatment effects across the found common support. Use of the local models, and extrapolation from local common support regions, mitigates the extrapolation risk.

The following equation is used for inferring counterfactual outcomes 210:

$$\theta_{jk}=E[Y^j-Y^k]$$

$$\theta_{jk}(x)=E[Y^j-Y^k|X=x]$$

Treatment dichotomy (j,k) is considered and it is assumed that the treatment dichotomy has some common support. Units that receive other treatments are ignored. Treatment effect $\hat{\theta}_{jk}(X_i)$ for units in the common support set only is estimated. It is assumed that unit i belongs to the common support set. If the unit receives treatment k, corresponding counterfactual outcome under control j is inferred as $\hat{Y}_i^j = \hat{Y}_i^k + \hat{\theta}_{jk}(X_i)$. On the other hand, if the unit receives treatment j, corresponding counterfactual outcome under control k is inferred as $\hat{Y}_i^k = \hat{Y}_i^j - \hat{\theta}_{jk}(X_i)$.

Any particular unit in the sample may be a member of none, one, or several common support sets associated with the treatment and/or the counterfactual treatments received by the particular unit. Accordingly, for any given unit, none, one, or several counterfactual outcomes may be estimated. Next are illustrated exemplary implementations to infer counterfactual outcomes by local causal effect estimates.

For example, assume that unit 1 is from a region in covariate space where the only treatment 204 observed is k=3. None of the units other treatments located near unit 1 receive other treatments, i.e. unit 1 is not a part of any common support region. As a consequence, no counterfactual outcomes are estimates for unit 1. Unit 2 is from a region where both treatments k=1, 2 are represented. The counterfactual outcome $\hat{Y}_2^2$ is estimated. Unit 3 is from a region where all treatments, k=1, 2, 3 are represented. Both counterfactual outcomes for unit 3 are estimated. The counterfactual outcome estimates are stored in a table illustrated by Table 3, where the lightly shaded cells are inferred by means of local causal effect estimates.

TABLE 3

| Treatments Units | k = 1 | k = 2 | k = 3 |
|---|---|---|---|
| 1 |  |  |  |
| 2 |  | ▓ |  |
| 3 | ▓ |  |  |
| 4 |  |  | ▓ |

Finally, a global model $\hat{\hat{Y}}(k,X)$ is developed. The global model models the regression of the previously estimated outcomes $\hat{Y}^k$, including counterfactual outcome estimates, on both X and k, that is, $E[\hat{Y}^k|k, X]$. The double hat notation indicates second-tier estimates, which are obtained by fitting through previous estimates. All cells of Table 4 shown below are filled with the global estimates. The darker shaded cells represent extrapolations.

TABLE 4

| Treatments Units | k = 1 | k = 2 | k = 3 |
|---|---|---|---|
| 1 | ▓▓ | ▓▓ |  |
| 2 |  | ▓ | ▓▓ |
| 3 | ▓ |  |  |
| 4 | ▓▓ |  | ▓ |

The global model allows predicting outcomes for new units. For a unit with covariates 202 $X=x$, the estimated outcomes for all treatments are given by $\hat{\hat{Y}}(k,x)$; k=1, ..., K. Based on assumptions, the global model may be used to predict outcomes for new treatments. One of the assumptions concerns ordinal treatments. Thus, one may assume a smooth relationship between treatment and outcome, replace the treatment index by the numeric treatment, and fit a regression function of the form $\hat{\hat{Y}}$(treatment value, X).

In summary, the model for global predictions is developed in two phases. Phase I essentially smoothes and augments the data with counterfactual outcome estimates, relying on interpolation only. Phase II fits a global model on the smoothed and augmented data set. To the extent that the counterfactual cells may be estimated, global model selection and estimation are less prone to global extrapolation problems as compared to developing a global model directly on the observed data. Smoothing performed in the Phase I may also facilitate global model selection, because variance and influence of outliners are reduced. The phased model development process indicates which cells represent extrapolations. A conservative user of the model may choose to ignore predictions for extrapolated cells and base future treatment decisions only on the interpolated results.

Risk Based Pricing Application:

In the following, a risk based pricing application is described, using a risk based pricing application estimation model described above.

Some lenders apply risk-based pricing to personal installment loans. Interest rate offers are affected by risk-related characteristics of an applicant of the loan, purpose of the loan or origination channel associated with the loan. Approved applicants may decide whether to take up the loan at the offered interest rate. Risk-based pricing may affect several business objectives including sales volume, revenues, profits and losses. Best interest rate offers for a population of applicants are often determined based on judgmental segmentation schemes, although an increasing number of businesses are interested to approach this problem empirically. One approach is to model expected outcomes of applicants on these business dimensions, as functions of potential price treatments.

Some institutions employ tiered approaches to pricing, where first a base interest rate is calculated, possibly subject to loan characteristics and market conditions. Then, a risk-based interest premium is decided. The risk-based interest premium refers to a number of percentage points of interest that are added to the base rate of interest. In one implementation, a concern is the effect of the interest rate premium (also referred to as "premium"). The base rate is treated as a covariate, which is known prior to treatment decision.

According to one implementation, the willingness of applicants to take the loan at any given treatment value is estimated. That is, individual price-response functions are estimated. Intuitively, negative treatment effects are expected, as higher interest rates may dissuade an applicant from taking up the loan. Further, different individuals may have different price sensitivities. Credit constrained or very loyal individuals may be willing to borrow at higher prices, while unconstrained and credit savvy consumers may walk away if the price is not competitive as the price may be associated with a high interest rate.

The empirical process is described below.

Data:

Applicants may need an approval to qualify for the loan application. Let there be N number (e.g. N=50,000) of loan applications for the approved applicants. The applicants may be approved based on continuous and categorical covariates 202 that are measured before the treatment decision and that include applicant credit bureau variables, risk scores, demographics, origination channel, loan details and base rate. The outcome variable $Y \in \{0,1\}$ indicates no-take/take response of the applicants. The treatment variable (Premium) assumes integer percentage values from 0 to 13%. Not all treatment values in this range are observed and the distribution is skewed towards lower values. The empirical analysis may be limited to 5 treatment groups containing more than 2,000 applicants each. The ordered treatment values may be indexed by k=1, 2, ..., 5 such that Premium(k)<Premium(k+1). Table 5 illustrates means and fractions/percentages associated with covariate and outcome for first 3 treatment groups. Table 5 further illustrates a comparison of covariates 202 and outcomes in the observed sample across the first three treatment groups.

TABLE 5

|  |  | Treatment (k) | | |
|---|---|---|---|---|
|  |  | 1 | 2 | 3 |
| Application Risk Score | | 172 | 140 | 134 |
| Applicant Age | | 47 | 42 | 37 |
| Channel: | Supermarket | 30% | 36% | 52% |
|  | Internet | 16% | 20% | 1% |
|  | Marketing | 54% | 44% | 47% |
| Residence: | Owns | 86% | 68% | 51% |
|  | Rents | 11% | 29% | 45% |
|  | Other | 3% | 3% | 4% |
| ... other covariates | | ... | ... | ... |
| Take Rate ($\bar{Y}$) | | 68% | 37% | 44% |

As expected from risk-based pricing, higher treatment values are associated with lower risk scores (lower creditworthiness). Distributions of age, origination channel, residential status, and of many other covariates may also differ substantially across the treatment groups. A "Take Rate" is highest for the lowest treatment (premium) value, as empirically noted and illustrated by Table 5. Accordingly, it is noted that the applicant population is highly sensitive to price premium. However, concluding that Take Rate increases as premium decreases may not always be correct, in view of the following. As noted earlier, direct comparisons of outcomes between treatment groups may be biased due to group differences. For example, Table 5 further illustrates that Take Rate actually increases with the treatment (premium) value for the (2,3) treatment dichotomy.

Thus, the intuition that take rate may increase as premium decreases does not justify the obtained empirical results, as noted in Table 5. Therefore, local common support assumption needs to be taken into account for a justification for the empirical results.

Common Support:

The 5 treatment groups, which are being considered in the empirical analysis, generate 10 treatment dichotomies (as each decision alternative may be either treatment 204 or control 206) for which propensity scores are determined. The associated propensity scores are modeled as generalized additive models in the form of scorecards. All measured covariates 202 are included into the models. Categorical predictors are expanded into binary indicator variables for the categories. Numeric covariates 202 are binned into 10-20 quantiles.

Figure 3:
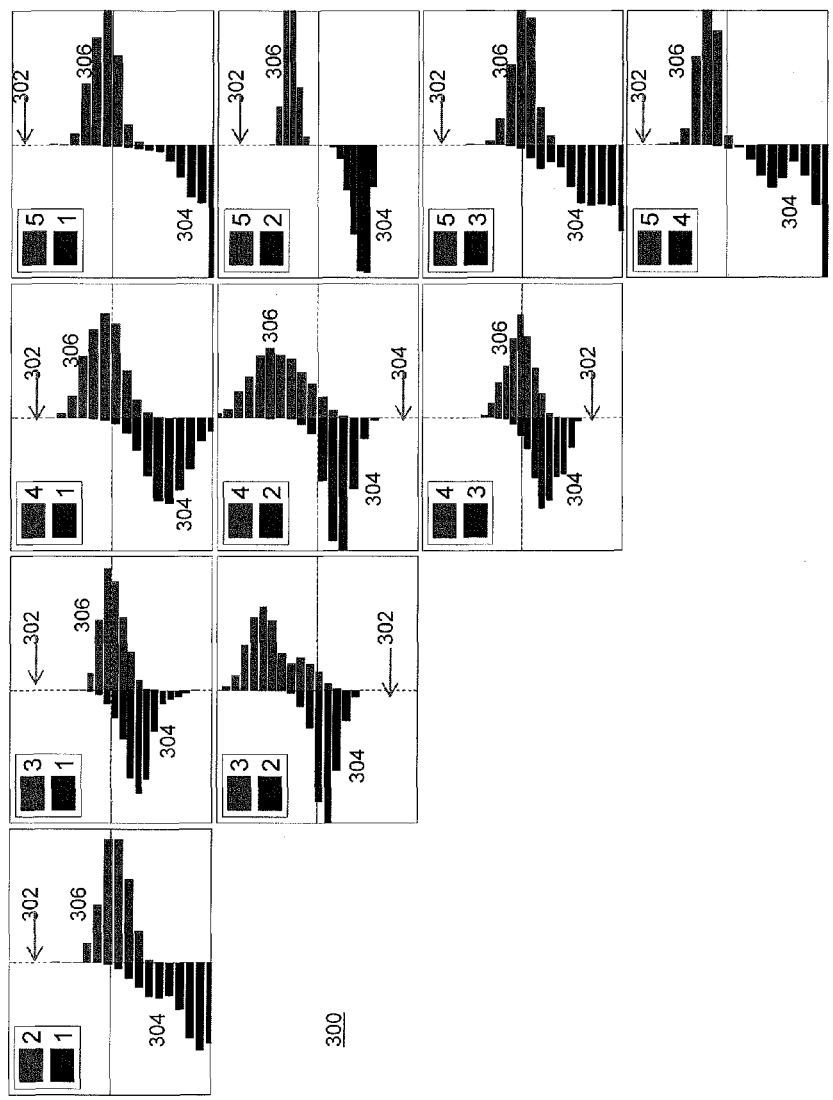
FIG. 3 illustrates the conditional propensity score distributions for treatment dichotomies in consistency with implementations of the current subject matter.

FIG. 3 is a plot 300 that illustrates the conditional propensity score distributions for all treatment dichotomies, wherein scores are scaled in a natural logarithm of odds (ln(Odds)). Vertical axes 302 span a score range of [−13, 13]. Scores outside this score range are truncated. Plot legends indicate treatment group (top) and control group (bottom). Bars 304, 306 represent probability masses for quantiles of truncated score distribution. Left hand bars 304 are for control group distributions, and right hand bars 306 are for treatment group distributions.

The plot 300 provides a quick grasp of the common support situation. None of the treatment dichotomies enjoys global common support. The common support situation is typically such that in the lowest score ranges, only controls (control 206 decision alternatives) are found, and in the highest score ranges, only treated (treatment 204 decision alternatives) are found. In intermediate score ranges, controls and treatments are found. The highest treatment group in the rightmost plot column largely lacks common support.

Determination of common support: The common support is determined as follows. Define the lower inner trim value as the value for which the empirical cumulative propensity score distribution of the treatment group exceeds 1%, and define the upper inner trim value as the value for which the empirical cumulative propensity score distribution of the control group reaches 99%. Units with propensity score values in the inner trim range are flagged as common support units.

Matched Sampling Results:

Now, matched sampling based on the propensity score is discussed and benefits of matched sample analysis for treatment effect estimation are described.

For all treatment dichotomies with some common support, pairs of treated and control units matched on the propensity score are sampled using a variant of a greedy pair-wise matching algorithm. A reservoir set with common support units and an empty matched set are initialized. It is assumed that there are fewer treated units in the reservoir than controls. However, in another aspect, it may be assumed that there are fewer controls in the reservoir than treated units, and in this case, just the roles of the treated and the controls need to be reversed. The treated units in the reservoir are visited in a random order. For each treated, an associated propensity score value is looked up and the control in the reservoir that has the closest propensity score value is found. If the propensity score difference between treated and closest control is below a threshold, called caliper, the treated and the closest associated control is added to the matched data set and both units are removed from the reservoir. The caliper size (i.e. value of the threshold) controls the closeness and number of matches. The closer the matches are sought, the fewer the matches are found. Thus, larger caliper sizes generate more matches. Although more matches due to large caliper sizes may reduce the variance of matched sample-based estimates, control is weaker, which may increase bias of these estimates.

Table 6 below illustrates matched sample results for the (2,3) treatment dichotomy. The matched sample results are for approximately 13,000 units that received these two (2,3) treatments. With a caliper size of 0.0001, approximately 3,500 matched units are obtained.

TABLE 6

| | | Treatment Index (k) | |
|---|---|---|---|
| | | 2 | 3 |
| Application Risk Score | | 137 | 137 |
| Applicant Age | | 40 | 39 |
| Channel: | Supermarket | 50% | 51% |
| | Internet | 1% | 1% |
| | Marketing | 49% | 48% |
| ... other covariates | | ... | ... |
| Take Rate ($\bar{Y}$) | | 41% | 38% |

The matched treated and controls have very similar covariate means, not just for the covariates 202 shown, but for all covariates 202. Notably, Take Rate now increases with the treatment value. The treatment effect has the expected sign after adjusting for all observed covariates 202. As noted above, the average treatment effect is estimated in the matched sample rather than estimating the average treatment effect globally. Thus, the insights gained from the matched sample analysis justify the accuracy of results while taking into consideration a local common support.

Figure 4:
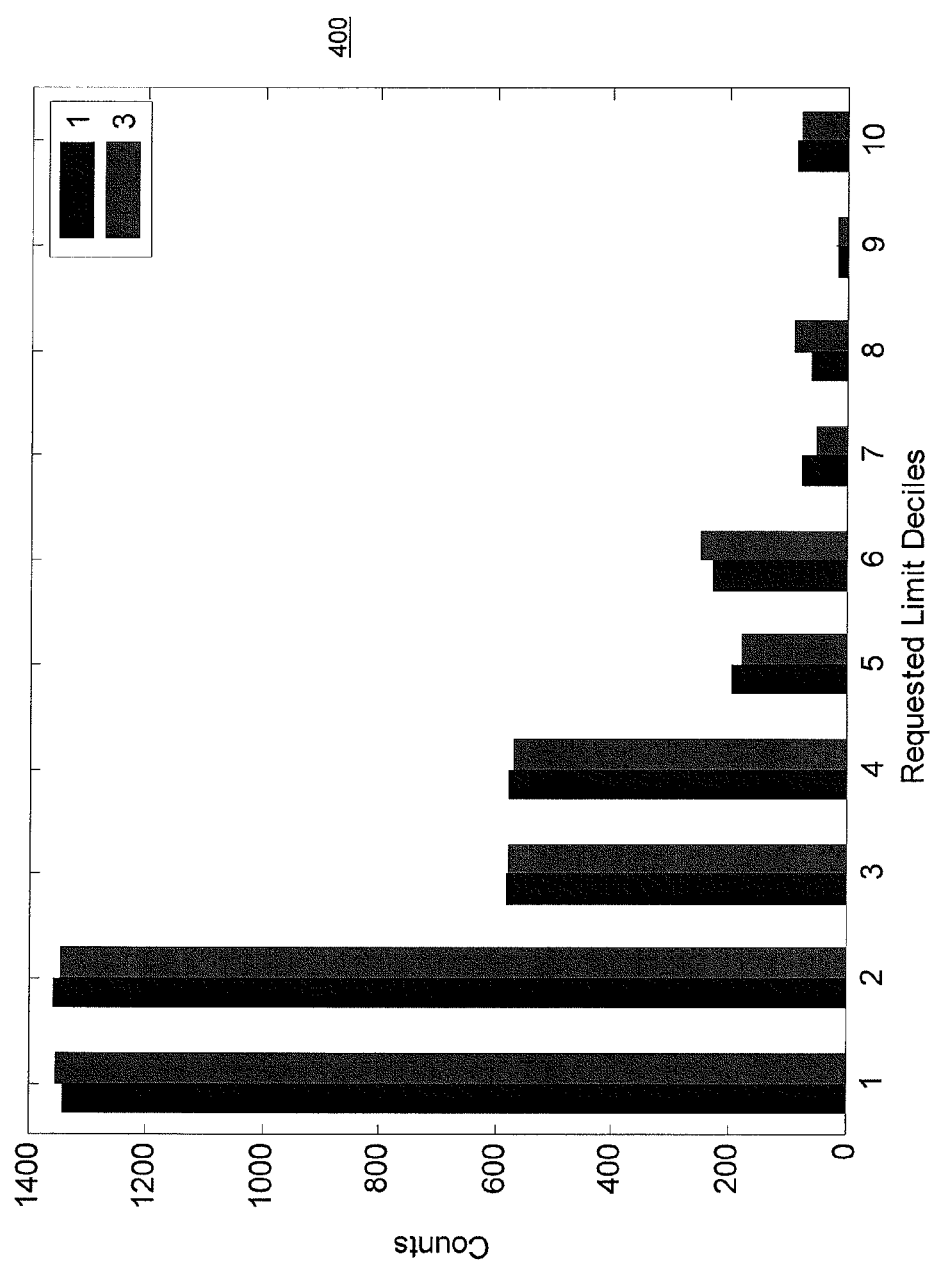
FIG. 4 is a histogram that illustrates an exemplary comparison of distributions of requested limit for a dichotomy in consistency with implementations of the current subject matter.

As discussed earlier, differences in higher order moments of the covariate distributions between the treatment groups may lead to biases when comparing matched sample outcomes, if the potential outcomes depend on the covariates 202 in a nonlinear fashion. This possibility may not be excluded. Accordingly, it is recommended not only to compare covariate means, but also to compare low-order moments of the covariate distributions, such as their variances. Grouped histogram plots may serve to compare univariate distributions between treated and controls. FIG. 4 is a histogram 400 that illustrates an exemplary comparison of distributions of "requested limit" for (1,3) dichotomy.

Diagnosing distribution differences for all covariates 202 and all treatment dichotomies may reveal improvement needs for propensity scores and matching parameters. What constitutes a good propensity score may be judged by the closeness of the matched distributions for all covariates 202, while a large number of matches is also desirable. As is well established in the art, matching with propensity scores in the form of scorecards tends to outperform matching with ordinary logistic regression propensity scores in terms of leading to more similar distributions, while the size of the matched samples tends to be smaller. This is understandable, because scorecards generally achieve better separation between groups due to their more flexible modeling of nonlinear relations. Similar to the choice of caliper size, the choice of a model for the propensity score affects the tradeoff between bias and variance. Sensitivity analysis may be performed for one to gain an appreciation for the possible impact of modeling decisions.

Individual and Group Treatment Effects:

Refined estimates of treatment effects may be obtained based on the matched samples. A straightforward approach that works for larger subpopulations of the applicant population is to subset the above matched sample analysis by subpopulations of interest, such as risk groups or age groups. Then, the empirical Take Rates are compared for the matched treated and the matched controls by subpopulation. A result of the empirical comparison may reveal different price sensitivities between the subpopulations. As noted earlier, such a result holds only for the matched sample, and may not be representative for the entire applicant population. However, after careful deliberation one may regard results of empirical comparisons as providing at least an insight for the entire applicant population.

A principal problem with subset analysis is that the analysis may quickly run out of data if estimates are sought for very specific subpopulations or individuals. Such requirements call for modeling the relationship between covariates 202, treatment, and outcome. Given suitable data, regression modeling of the outcome as a function of covariates 202 and treatment may be a powerful discovery tool. Regression models may be structured in flexible ways to include interaction terms between the treatment variable and covariates 202. This allows the treatment effect to depend on values of the covariates 202. It is important that suitable data be used in regression analysis, at least for the reason that regression analysis may be unreliable for the purpose of estimating causal treatment effects from observational data, due to hidden extrapolation problems and the sensitivity of results to untestable assumptions about the form of the extrapolation. Thus, as noted above, the regression analysis may be performed on specifically matched samples. The properties of the matched sample mitigate extrapolation problems.

Let $M_0$, $M_1$ be the control and treated units in the matched sample, respectively. Define:

$\rho_0(X) \equiv E[Y|X$, units in $M_0] = Pr\{Take|X$, units in $M_0\}$, $\rho_1(X) \equiv E[Y|X$, units in $M_1] = Pr\{Take|X$, units in $M_1\}$.

The treatment effect at $X=x$ is $\theta(x)=\rho_1(x)-\rho_0(x)$, which follows from the assumptions of unconfoundeness and common support. The expression $\theta(x)=\rho_1(x)-\rho_0(x)$ can be estimated by developing separate scorecards for $\hat{\rho}_0(x)$ based on the units in $M_0$, and for $\hat{\rho}_1(x)$ based on the units in $M_1$, using penalized maximum likelihood estimation. Individual-level treatment effect estimates for matched or common support units are given by $\hat{\theta}(X_i)=\hat{\rho}_1(X_i)-\hat{\rho}_0(X_i)$.

For diagnostic purposes and to gain more insights into price sensitivity, individual-level effect estimates are aggregated to generate subpopulation-level estimates (means, prediction intervals), for a few subpopulations of interest.

Figure 5:
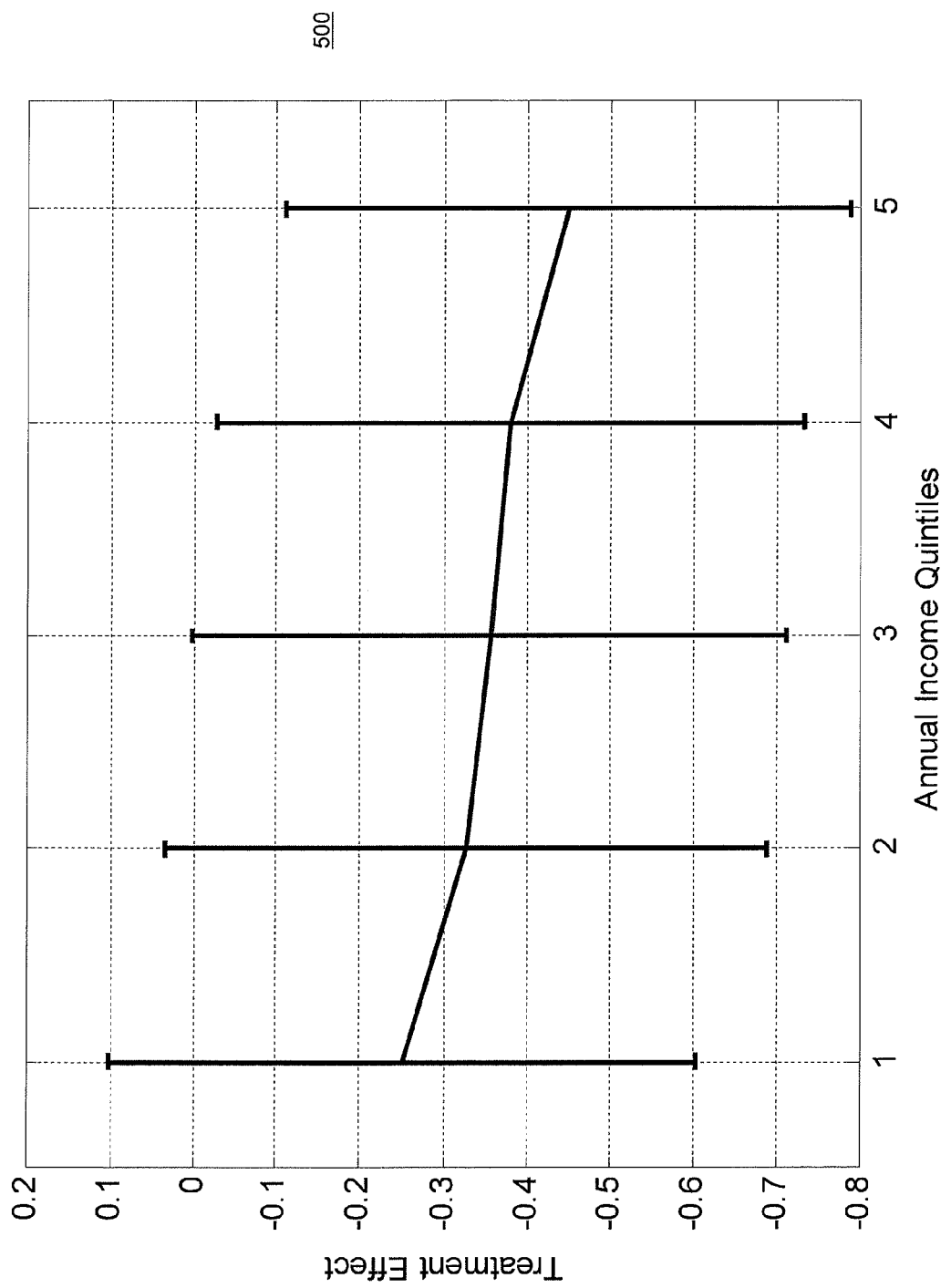
FIG. 5 is a graph that illustrates treatment effect estimates for subpopulations based on income quintiles of the covariate distributions in the matched sample in consistency with implementations of the current subject matter.

FIG. 5 is a graph 500 that illustrates treatment effect estimates for subpopulations based on income quintiles of the covariate distributions in the matched sample. FIG. 5 further illustrates an estimated change of Take Rate when moving from treatment 1 to treatment 2, by income. The vertical bars indicate 95% prediction intervals. The matched sample for the (1,2) treatment dichotomy is used for the analysis illustrated in FIG. 5, and the results are conditional on this matched sample. Higher income is associated with increased price sensitivity. Even after controlling for income, price sensitivity is still very heterogeneously distributed within the income segments. Age and price sensitivity do not appear to be strongly associated in this sample. More insights are gained for other subpopulations of interest, for example, higher loan amounts, higher risk scores, and internet or supermarket marketing channels are associated with higher price sensitivity. Following the estimation process model described above, the data is augmented with inferred counterfactual outcomes for the common support units, based on estimates for individual-level causal effects.

Figure 6:
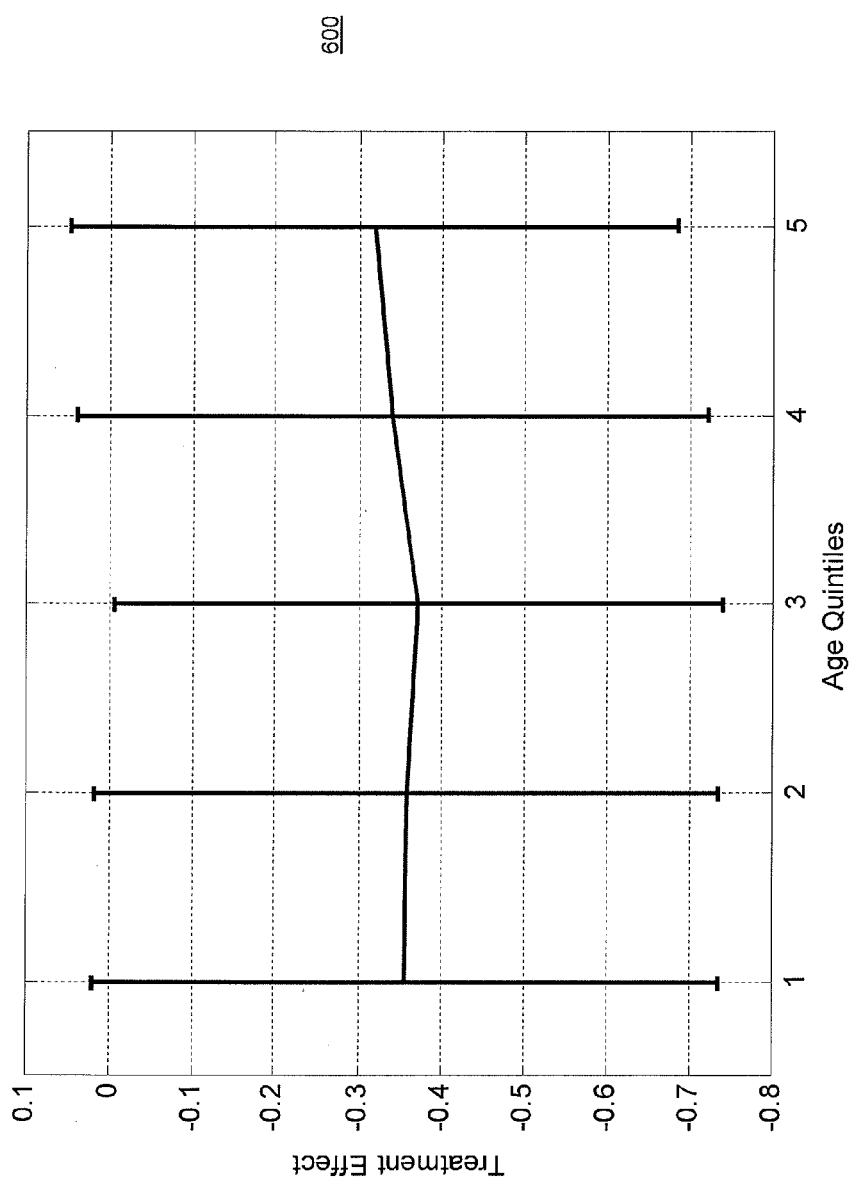
FIG. 6 is a graph that illustrates treatment effect estimates for subpopulations based on age quintiles of the covariate distributions in the matched sample in consistency with implementations of the current subject matter.

FIG. 6 is a graph 600 that illustrates treatment effect estimates for subpopulations based on age quintiles of the covariate distributions in the matched sample. FIG. 6 further illustrates an estimated change of Take Rate when moving from treatment 1 to treatment 2, by age. The vertical bars indicate 95% prediction intervals. The matched sample for the (1,2) treatment dichotomy is used for the analysis illustrated in FIG. 6, and the results are conditional on this matched sample.

Modeling the Premium Response Function:

When developing a global model for the premium-response function, it is plausible to assume that the predictions $\hat{Y}(k,X)$ may depend on the treatment value in the form of somewhat smooth, monotonic decreasing curves, due to the ordinal nature of the treatment variable. For this assumption to hold, a model of the form $\hat{Y}$(premium, X) may be developed, where the predictions depend on premium by means of a cubic B-spline expansion. The use of the cubic B-spline expansion avoids strong functional assumptions such as linearity and constant elasticity. Further, the cubic B-spline expansion also has a technical advantage that monotonicity may be imposed through constraints on the B-spline expansion coefficients. Imposing monotonicity may reduce variation and may improve extrapolation behavior, as compared to unrestricted polynomial regression that may lead to counterintuitive extrapolations. As described above, price sensitivity is heterogeneously distributed across the applicants. This distribution of price sensitivity is accommodated by allowing for interaction terms between premium and covariates 202. The model is fitted using penalized maximum likelihood, subject to constraints on B-spline expansion coefficients. For testing purposes, the model may be constrained to a linear premium-response relationship. All covariates 202 are used as predictors in their binned representations, thus allowing for nonlinear relationships between covariates 202 and predictions to be modeled. Interaction terms between covariates 202 and premium are tested and added to the model by a domain expert in a forward-selecting manner, which allows for additional judgment to enter the modeling process.

Results confirm the nonlinear premium-response relationship and the existence of significant premium-covariate interactions. Selection of interaction terms by the domain expert largely coincide with selecting those terms that most improve the RMSE measure of fit quality. It is observed that the most predictive interactions tend to make the most business sense.

To gain insight into the global model fit, subpopulations of applicants are considered. For each subpopulation, $\hat{Y}$(Premium, $X_{i \in subpopulation}$) is estimated over the interval Premium$\in[0,15\%]$ in steps of 1%, which includes the treatment values found in the data, but also other treatment values inside and outside the observed treatment range. The premium-response function for a subpopulation is defined as an average over the individual-level premium-response functions in that subpopulation. The premium-response function for subpopulation s is denoted by $\hat{Y}$(Premium, s). To compare the behavior across different subpopulations, incremental response curves of the form $\Delta$(Premium, s)=$\hat{Y}$(Premium, s)−$\hat{Y}$(Premium=0, s) as functions of Premium for different values of s are plotted into a chart. The incremental response curves intersect at the origin, which facilitates visual comparisons.

Figure 7:
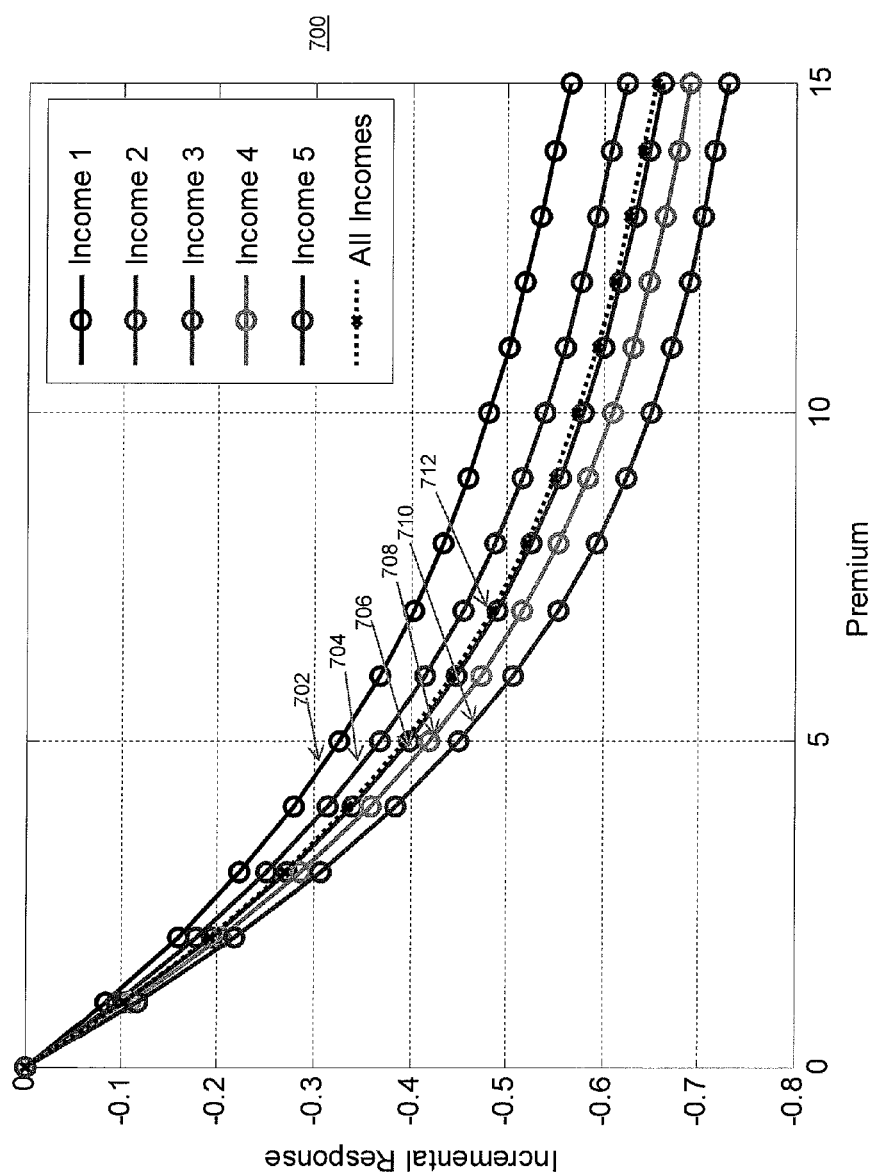
FIG. 7 is a graph that illustrates exemplary incremental response curves that compares subpopulations defined by income quintiles in consistency with implementations of the current subject matter.

FIG. 7 is a graph 700 that illustrates exemplary incremental response curves 702, 704, 706, 708, 710, 712 that compares subpopulations defined by income quantiles. Solid lines 702, 704, 706, 708, 710 are for quintiles defined by Income, which is enumerated from the lowest to the highest quintile. Dotted line 712 indicates the average across the applicant sample. Take rate decreases more rapidly for low values of premium and more slowly for higher premiums. Higher incomes are associated with higher price sensitivity, as higher incomes attract good competitor offers since people with higher incomes may be less constrained to spend.

Figure 8:
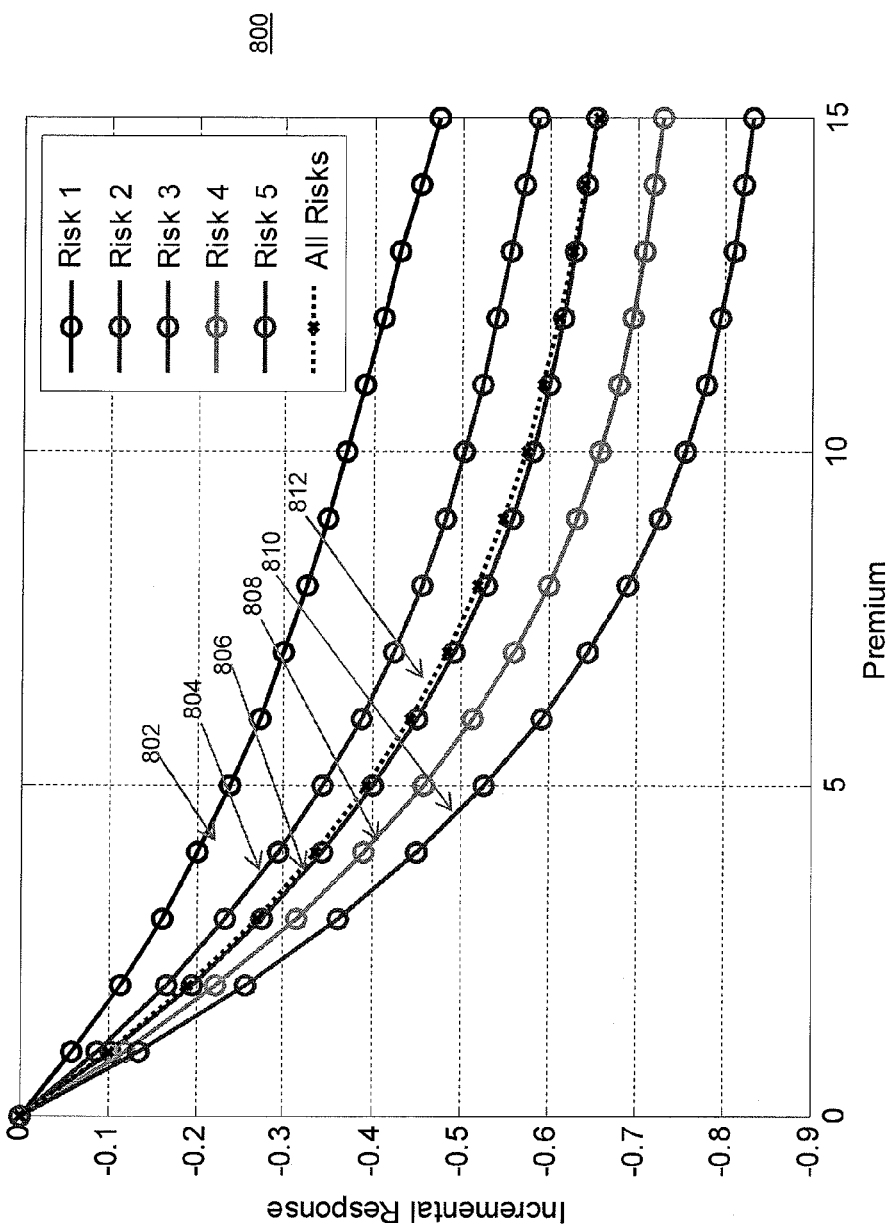
FIG. 8 is a graph that illustrates exemplary incremental response curves that compares subpopulations defined by risk score quintiles in consistency with implementations of the current subject matter.

FIG. 8 is a graph 800 that illustrates exemplary incremental response curves 802, 804, 806, 808, 810, 812 that compares subpopulations defined by risk score quantiles. Solid lines 802, 804, 806, 808, 810 are for quintiles defined by Risk Score, which is enumerated from the lowest to the highest quintile. Dotted line 812 indicates the average across the applicant sample. Take rate decreases more rapidly for low values of premium and more slowly for higher premiums. Higher risk scores (more creditworthy applicants) are associated with higher price sensitivity, as these groups attract good competitor offers.

Credit Line Increase Application:

Lenders periodically review credit bureau information and credit card spending and payment behavior to decide on potential credit line adjustments. Intuitively, limits for risky, unprofitable accounts may be decreased, while limits for accounts in good standing and with growth potential may be increased. A related question concerns the adjustment amount, if any. Many institutions employ automated account management systems that decide on line increases based on rules. The decision rule may be very complex and may depend on many variables, including customer loyalty data, credit bureau information, scores for risk, revenue and attrition, spending patterns, payment behavior, closeness to current credit limit, and trends in any of these variables. Many organizations also test rule alternatives, also known as champion-challenger testing. Credit line changes affect various important business outcomes, including revenue, costs, spending behavior, attrition, default likelihood and losses. As can be seen, card balances are affected by line increases and the balance-response function can be estimated. Intuitively, nonnegative treatment effects are expected, as higher lines enable higher balances, while there is little reason to suspect that higher lines reduce balances. Further, responses are expected to differ by individual. Severely credit constrained individuals will move to the new limit, others may respond muted or may not change their card usage.

Data:

In one set of tests, for N=200,000 accounts who tend to revolve most of their balances from month to month, 150+ continuous and categorical covariates 202 are measured before the treatment decision, characterizing customers and their account behaviors. Many variables are derived from raw data fields, such as financial ratios, smoothed time series averages, rates of spending changes, etc. The treatment variable (Increase) assumes discrete values from 0 to $4,000 that typically come in multiples of $500. Covariate distributions differ substantially between the treatment groups. As outcome variable, card balance for 12 months is used following the treatment decision.

Figure 9:
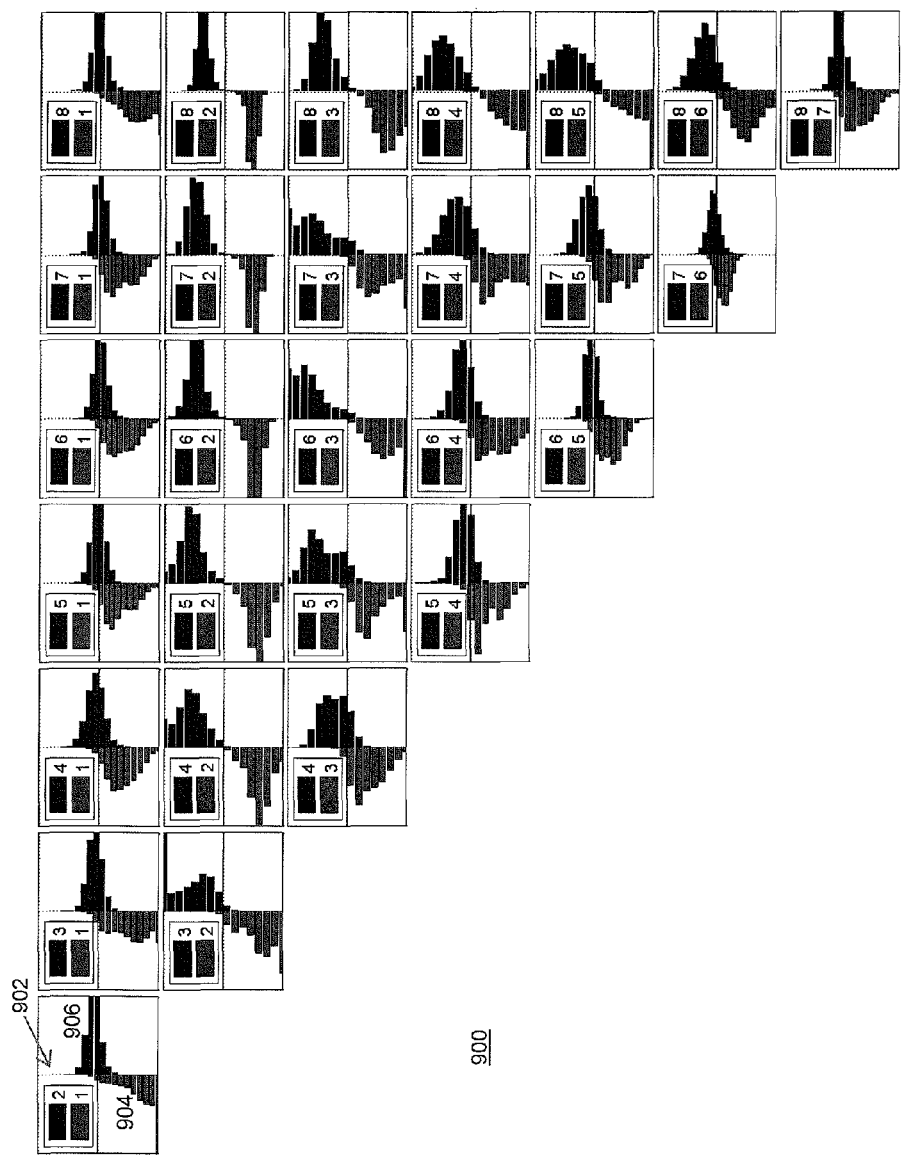
FIG. 9 is a plot that illustrates the conditional propensity score distributions for treatment dichotomies consistent with implementations of the current subject matter.

Common Support:

The exemplary analysis is limited to 8 treatment groups containing more than 4,000 applicants each. The ordered treatment values are indexed by k=1, 2, . . . , 8, such that Increase(k)<Increase(k+1). This generates 28 treatment dichotomies for which propensity scores are developed. FIG. 9 is a plot 900 that illustrates the 28 treatment dichotomies. The associated propensity scores are modeled as generalized additive models in the form of scorecards. All covariates 202 are included into the propensity scores, with one notable exception. The exception is a random number that is generated to conduct a randomized champion-challenger test comparing alternative line increase rules. While this exception is associated with the treatment, the exception may be safely ignored for purposes of matching and estimating treatment effects, since the exception is unrelated to the potential outcomes.

Plot 900 further illustrates conditional propensity score distributions for all treatment dichotomies, wherein scores are scaled in a natural logarithm of odds (ln(Odds)). Vertical axes 902 span a score range of [−13, 13]. Scores outside this score range are truncated. Plot legends indicate treatment group (top) and control group (bottom). Bars 904, 906 represent probability masses for quantiles of truncated score distribution. Left hand bars 904 are for control group distributions, and right hand bars 906 are for treatment group distributions. For simplicity of the illustrated figure, vertical axis 902, left hand bars 904, and right hand bars 906 have been labeled for only one pair of dichotomy. Other dichotomies are understood to have a similar labeling.

Plot 900 further illustrates that treatment group 1 (Increase=0, first row) enjoys limited (localized) common support with all other treatment groups. Treatment group 2 (second row) lacks common support with most other groups. Common support tends to be much reduced or non-existent for very dissimilar treatments, as one may expect. Some dichotomies enjoy larger common support, such as (6,7), (7,8). It turns out that the random variable is particularly predictive for such dichotomies that have a larger common support, while it is less predictive for other dichotomies. The random variable being more predictive for dichotomies having a larger common support constitutes evidence that the champion-challenger test is focused mostly on aspects of decision rules that concern assignment to higher treatment values.

Matched Sampling Results:

For all treatment dichotomies with some common support, matching is performed based on the propensity score. Balanced covariate distributions between matched treated and controls are obtained.

Figure 10:
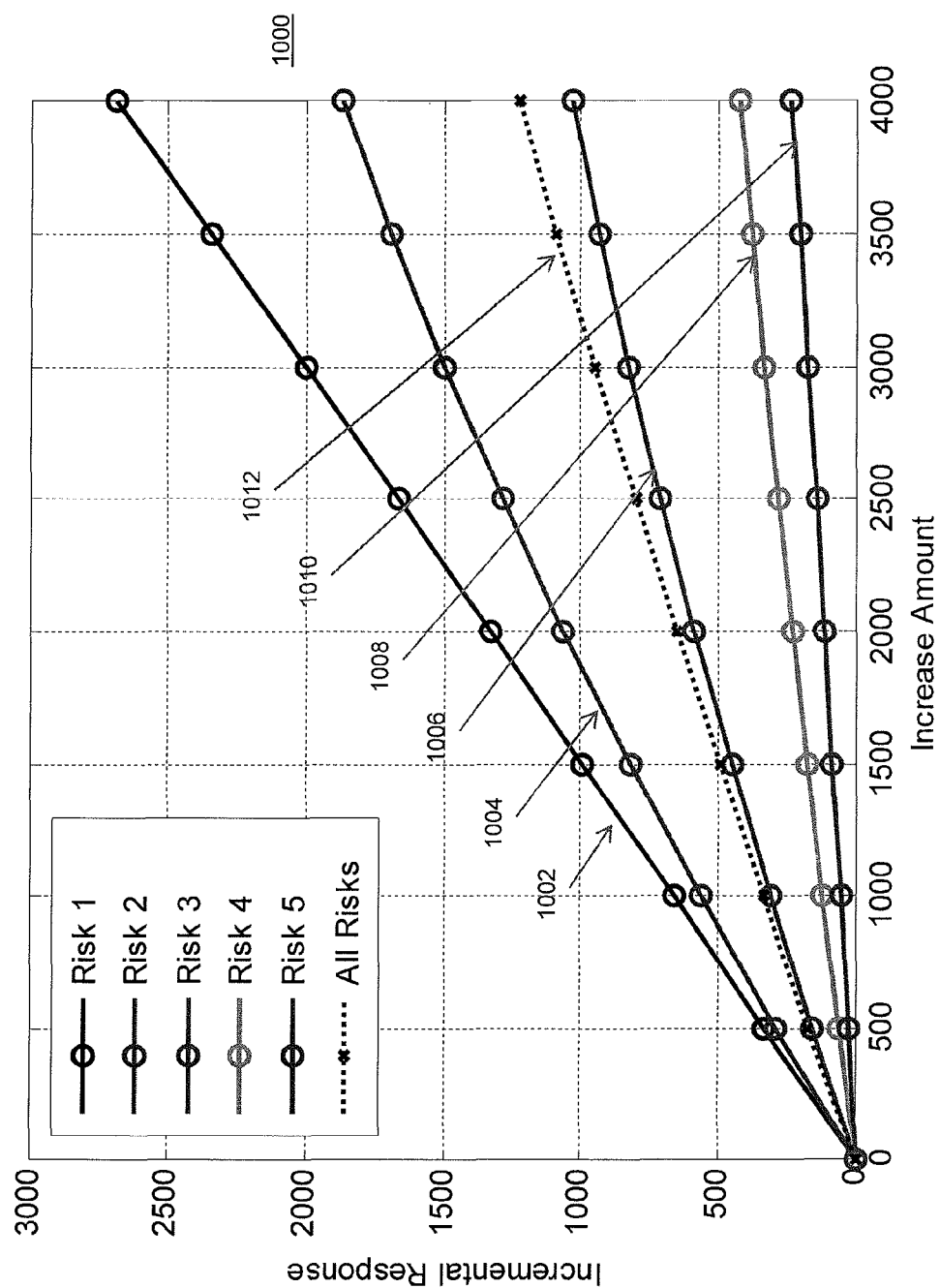
FIG. 10 is a graph that illustrates incremental balance response curves for subpopulations distinguished by risk in consistency with implementations of the current subject matter.

Balance-Response function:

FIG. 10 is a graph 1000 that illustrates incremental balance response curves 1002, 1004, 1006, 1008, 1010, 1012 for subpopulations distinguished by risk. Generally, balance increases almost linearly with increase amount. Customers with lower bankruptcy scores (more likely to experience bankruptcy) and accounts with balances close to the old limit respond strongest, as individuals with lower bankruptcy scores are more likely credit constrained. When treated with a line increase, individuals with lower bankruptcy scores make use of the increased available credit to increase balances. Customers with high bankruptcy scores show muted responses. Solid lines 1002, 1004, 1006, 1008, 1010 are for quintiles defined by Risk Score, which is enumerated from the lowest to the highest quintile. Dotted line 1012 indicates the sample average.

Figure 11:
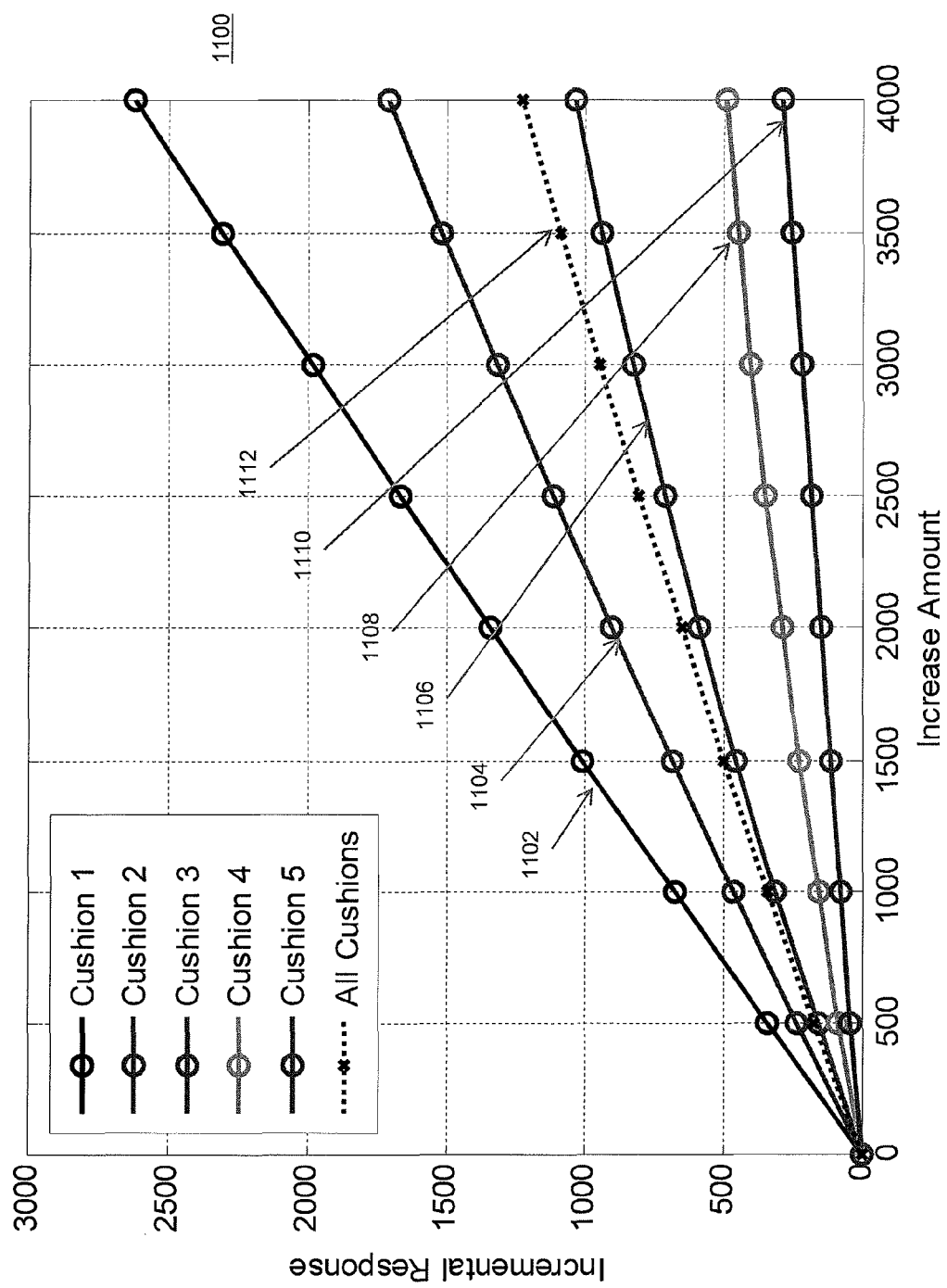
FIG. 11 is a graph that illustrates incremental balance response curves for subpopulations distinguished by cushion (unused amount between historic limit and historic balance) in consistency with implementations of the current subject matter.

FIG. 11 is a graph 1100 that illustrates incremental balance response curves 1102, 1104, 1106, 1108, 1110, 1112 for subpopulations distinguished by Cushion, which is equivalent to an unused amount between historic limit and historic balance. Generally, balance increases almost linearly with increase amount. A large fraction of accounts with balances near historic limits may be constrained from borrowing on their card as much as they may like. When treated with a line increase, individuals with accounts having balances near historic limits make use of the increased available credit to increase their balances. Customers with high bankruptcy scores and balances far below historic limits show muted responses. Solid lines 1102, 1104, 1106, 1108, 1110 are for quintiles defined by Risk Score, which is enumerated from the lowest quintile to the highest quintile. Dotted line 1112 indicates the sample average.

The subject matter described herein may be embodied in systems, apparatus, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, which may also be referred to programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, the subject matter described herein may be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component, such as for example one or more data servers, or that includes a middleware component, such as for example one or more application servers, or that includes a front-end component, such as for example one or more client computers having a graphical user interface or a Web browser through which a user may interact with an implementation of the subject matter described herein, or any combination of such back-end, middleware, or front-end components. A client and server are generally, but not exclusively, remote from each other and typically interact through a communication network, although the components of the system may be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

determining, using one or more processors, covariates associated with a unit representing at least one of an individual and an account of the individual;

determining, using the one or more processors, decision alternatives based on the covariates, a probability that a decision alternative has a predetermined value being independent of values of the covariates;

determining, using the one or more processors, potential outcomes for the decision alternatives, the potential outcomes being independent of the decision alternatives; and determining, using the one or more processors, a treatment effect by performing a statistical analysis using the potential outcomes.

2. The method in accordance with claim 1, wherein the decision alternatives comprise a treatment and a control.

3. The method in accordance with claim 2, wherein:
the treatment is a decision alternative that is undertaken for the unit such that the treatment occurs in an observed environment; and
the control is a decision alternative that is not undertaken for the unit such that the treatment occurs in a hypothetical environment.

4. The method in accordance with claim 1, wherein the determining of the potential outcomes is performed using a causal model, the causal model being a rubin causal model.

5. The method in accordance with claim 4, wherein the causal model accounts for multiple dimensions corresponding to the determined covariates by determining a propensity score that encompasses an effect of the determined covariates such that the causal model is based on a single dimension corresponding to the propensity score.

6. The method in accordance with claim 1, wherein:
the determining of potential outcomes is based, for consistency of the determined potential outcomes with empirical historical results, on conditions of unconfoundedness and localized common support.

7. The method in accordance with claim 6, wherein:
the unconfoundedness is associated with the determined potential outcomes that are conditionally independent of the decision alternatives; and
the localized common support is associated with a conditional probability that is between zero and one, the conditional probability being a propensity score that encompasses an effect of the determined covariates when the determining of the potential outcomes is performed.

8. The method in accordance with claim 1, wherein the determined potential outcomes and the treatment effect are displayed graphically.

9. A computer program product comprising a non-transitory machine-readable medium storing instructions that, when executed by at least one programmable processor, cause the at least one programmable processor to perform operations comprising:
determining, using one or more processors, covariates associated with a unit representing at least one of an individual and an account of the individual;
determining, using the one or more processors, decision alternatives based on the covariates;
determining, using the one or more processors, potential outcomes for the decision alternatives; and
determining, using the one or more processors, a treatment effect by performing a statistical analysis using the potential outcomes.

10. The computer program product in accordance with claim 9, wherein the decision alternatives comprise a treatment and a control.

11. The computer program product in accordance with claim 10, wherein:
the treatment is a decision alternative that is undertaken for the unit such that the treatment occurs in an observed environment; and
the control is a decision alternative that is not undertaken for the unit such that the treatment occurs in a hypothetical environment.

12. The computer program product in accordance with claim 9, wherein the determining of the potential outcomes is performed using a causal model, the causal model being a rubin causal model.

13. The computer program product in accordance with claim 12, wherein the causal model accounts for multiple dimensions corresponding to the determined covariates by determining a propensity score that encompasses an effect of the determined covariates such that the causal model is based on a single dimension corresponding to the propensity score.

14. The computer program product in accordance with claim 9, wherein:
the determining of potential outcomes is based, for consistency of the determined potential outcomes with empirical historical results, on conditions of unconfoundedness and localized common support.

15. The computer program product in accordance with claim 14, wherein:
the unconfoundedness is associated with the determined potential outcomes that are conditionally independent of the decision alternatives; and
the localized common support is associated with a conditional probability that is between zero and one, the conditional probability being a propensity score that encompasses an effect of the determined covariates when the determining of the potential outcomes is performed.

16. A system comprising:
at least one programmable processor; and
a non-transitory machine-readable medium storing instructions that, when executed by the at least one processor, cause the at least one programmable processor to perform operations comprising:
determining, using one or more processors, covariates associated with a unit representing at least one of an individual and an account of the individual;
determining, using the one or more processors, decision alternatives based on the covariates, a probability that a decision alternative has a predetermined value being independent of values of the covariates;
determining, using the one or more processors, potential outcomes for the decision alternatives, the potential outcomes being independent of the decision alternatives; and
determining, using the one or more processors, a treatment effect by performing a statistical analysis using the potential outcomes.

17. The system in accordance with claim 16, wherein:
the decision alternatives comprise a treatment and a control;
the treatment is a decision alternative that is undertaken for the unit such that the treatment occurs in an observed environment; and
the control is a decision alternative that is not undertaken for the unit such that the treatment occurs in a hypothetical environment.

18. The system in accordance with claim 16, wherein the determining of the potential outcomes is performed using a rubin causal model.

19. The system in accordance with claim 18, wherein the rubin causal model accounts for multiple dimensions corresponding to the determined covariates by determining a propensity score that encompasses an effect of the determined covariates such that the rubin causal model is based on a single dimension corresponding to the propensity score.

20. The system in accordance with claim 16, wherein:
the determining of potential outcomes is based, for consistency of the determined potential outcomes with empirical historical results, on conditions of unconfoundedness and localized common support;
the unconfoundedness is associated with the determined potential outcomes that are conditionally independent of the decision alternatives; and the localized common support is associated with a conditional probability that is between zero and one, the conditional probability being a propensity score that encompasses an effect of the determined covariates when the determining of the potential outcomes is performed.

* * * * *